US009491661B2

(12) United States Patent
Elrefaey et al.

(10) Patent No.: US 9,491,661 B2
(45) Date of Patent: Nov. 8, 2016

(54) CLOUD SPECTRUM MANAGEMENT SYSTEM

(71) Applicant: Intel Corporation, Santa Clara, CA (US)

(72) Inventors: Mohamed Elrefaey, Cairo (EG); Hani H. Elgebaly, Cairo (EG); Mohamed H. Shoeb, Cairo (EG)

(73) Assignee: Intel Corporation, Santa Clara, CA (US)

( * ) Notice: Subject to any disclaimer, the term of this patent is extended or adjusted under 35 U.S.C. 154(b) by 455 days.

(21) Appl. No.: 13/717,049

(22) Filed: Dec. 17, 2012

(65) Prior Publication Data

US 2014/0171136 A1    Jun. 19, 2014

(51) Int. Cl.
*H04W 72/00* (2009.01)
*H04B 7/00* (2006.01)
*H04W 28/16* (2009.01)
*G06Q 30/08* (2012.01)
*H04W 16/14* (2009.01)

(52) U.S. Cl.
CPC ............ *H04W 28/16* (2013.01); *G06Q 30/08* (2013.01); *H04W 16/14* (2013.01)

(58) Field of Classification Search
USPC ............. 455/450–453, 456.2, 464, 509, 510; 705/35, 37
See application file for complete search history.

(56) References Cited

U.S. PATENT DOCUMENTS

| 6,690,929 | B1 | 2/2004 | Yeh |
| 8,351,920 | B2* | 1/2013 | Gallagher ............. H04W 24/02 370/328 |
| 8,958,810 | B2 | 2/2015 | Buddhikot et al. |
| 2004/0192324 | A1 | 9/2004 | Rudkin |
| 2005/0064874 | A1 | 3/2005 | Beacken |
| 2006/0083205 | A1 | 4/2006 | Buddhikot et al. |
| 2006/0143111 | A1* | 6/2006 | Mylet ............... G06Q 30/06 705/37 |
| 2006/0160543 | A1 | 7/2006 | Mashinsky |
| 2008/0222019 | A1 | 9/2008 | Stanforth et al. |

(Continued)

FOREIGN PATENT DOCUMENTS

| CN | 102026201 A | 4/2011 |
| TW | 201006273 A | 2/2010 |

OTHER PUBLICATIONS

International Preliminary Report on Patentability and Written Opinion received for PCT Patent Application No. PCT/US2013/043527, mailed on Aug. 23, 2013, 11 pages.
Office Action received for U.S Appl. No. 13/799,530, mailed on Mar. 3, 2015, 16 pages.

(Continued)

*Primary Examiner* — Dominic Rego
(74) *Attorney, Agent, or Firm* — Grossman, Tucker, Perrault & Pfleger, PLLC

(57) ABSTRACT

This disclosure is directed to a cloud spectrum management system. In general, an example cloud spectrum management system may match requests from spectrum requestors seeking available radio spectrum with spectrum owners desiring to lease available radio spectrum to determine radio spectrum trade transactions. An example system may include a market communication module to communicate with a marketplace for trading a spectrum of radio frequencies for use in wireless communication, a core service s module to determine radio spectrum trade transactions based at least on the communications between the market communication module and the market, and a management utilities module configured to manage the radio spectrum trade transactions determined by the core services module.

10 Claims, 7 Drawing Sheets

(56) References Cited

U.S. PATENT DOCUMENTS

| | | |
|---|---|---|
| 2010/0097952 A1 | 4/2010 | McHenry et al. |
| 2011/0029347 A1 | 2/2011 | Kozat et al. |
| 2012/0120887 A1* | 5/2012 | Deaton ............... H04W 16/14 370/329 |
| 2012/0264396 A1 | 10/2012 | Smith et al. |
| 2013/0275346 A1* | 10/2013 | Srikanteswara ...... H04W 16/14 706/12 |
| 2014/0146693 A1 | 5/2014 | Chetlur et al. |

OTHER PUBLICATIONS

International Preliminary Report on Patentability and Written Opinion received for PCT Patent Application No. PCT/US2013/043527, mailed on Jul. 2, 2015, 9 pages.

Office Action received for Taiwan Patent Application No. 103107488, mailed on Jul. 30, 2015, 5 pages of English translation and 7 pages of Taiwan Office Action.

European Search Report received for European Patent Application No. 13864654.2, mailed Jul. 14, 2016, 7 pages.

\* cited by examiner

CLOUD SPECTRUM MANAGEMENT SYSTEM

TECHNICAL FIELD

The present disclosure relates to spectrum management, and more particularly, to systems to facilitate trade transactions between owners of available radio spectrum and spectrum requestors.

BACKGROUND

As wireless technology continues to evolve, the number of wireless-enabled devices in the marketplace continues to expand. Not only are devices emerging that are primarily tasked with wireless communication (e.g., cellular handsets, smartphones, etc.), but also applications that did not previously include any form of communication functionality are becoming able to interact wirelessly. For example, vehicles, appliances, heating, ventilation and air conditioning (HVAC) systems, thermostats, manufacturing equipment, security systems, street signs etc. may all be configured to interact wirelessly, with other wireless applications being devised daily.

While the benefits of communication functionality associated with wireless devices may be apparent, an unintended consequence of this wireless explosion is the large amount of traffic that has been created. Wireless communication bandwidth may generally be divided into two categories: regulated spectrum and unregulated spectrum. Regulated spectrum may be reserved for government services (e.g., police, fire, etc.) or licensed to a wireless service provider for use exclusively by their subscribers. Unregulated spectrum may be used by anyone and is typically limited to short-range wireless communication mediums (e.g., Bluetooth, wireless local area networking (WLAN), etc.) in relatively "noisy" bandwidths. It might seem logical that designers would want to use unregulated spectrum whenever possible due to availability, cost savings, etc. While unregulated spectrum may be attractive for some uses, the limitations on its use (e.g., only for short-range wireless communication), interference caused by other signal sources operating in the same spectrum, etc. do not allow it to be a direct replacement for regulated spectrum. On the other hand, the amount of regulated spectrum is very limited, and thus, leasing it may be very costly. Regardless, exponential growth caused by new subscribers is continues to drive demand.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
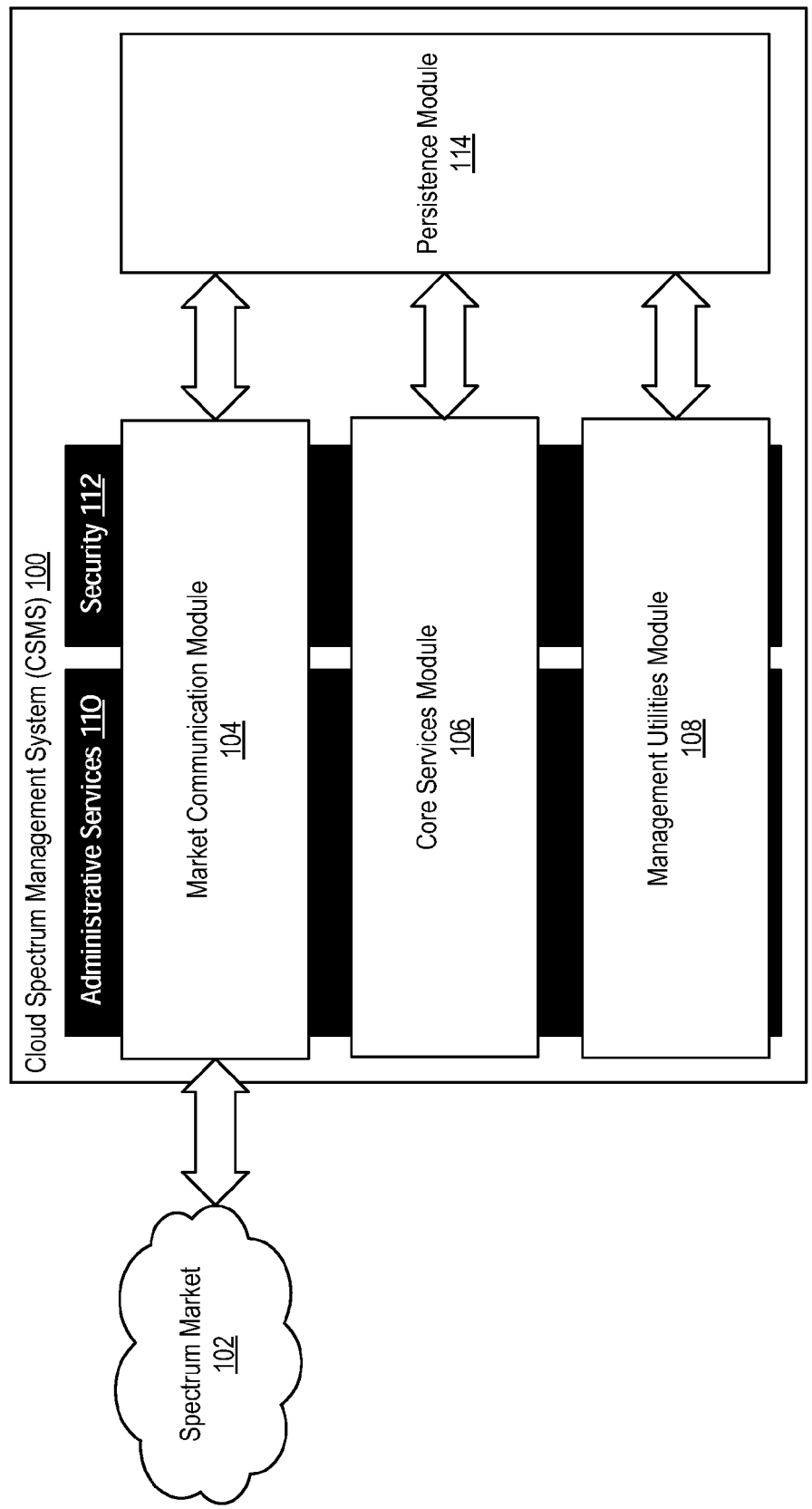
FIG. 1 illustrates an example cloud spectrum management system interacting with a spectrum market in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a cloud spectrum management system. In general, an example cloud spectrum management system may receive requests from spectrum requestors seeking available radio spectrum and spectrum owners desiring to lease available radio spectrum and/or seeking to reclaim leased radio spectrum. The cloud spectrum management system may accumulate these requests and match spectrum requestor requests with spectrum owners having available radio spectrum to lease. The resulting radio spectrum trade transactions may be carried out by the cloud spectrum management system, which may further monitor the radio spectrum trade transactions to help ensure that they are carried out in accordance with the agreed to terms.

In one embodiment, an example system may include a market communication module to communicate with a market place for trading a spectrum of radio frequencies for use in wireless communication, a core service s module to determine radio spectrum trade transactions based at least on the communications between the market communication module and the market, and a management utilities module configured to manage the radio spectrum trade transactions determined by the core services module. The market communication module may comprise, for example, at least one application programming interface (API) to receive information from at least one of spectrum requestors seeking available radio spectrum or spectrum owners desiring to lease available radio spectrum or reclaim leased radio spectrum. The market communication module may further include at least one of a request processor to accumulate the information received from the spectrum requestors and spectrum owners, an event processor to monitor the request processor for events, and a cloud controller to communicate with the core services module (e.g., to forward the spectrum requests received from the spectrum market).

An example core services module may comprise a realtime trading engine to receive the accumulated information from the market information module and an analytics engine utilizing at least one of a multi-objective optimization engine or a cognitive engine to determine the radio spectrum trade transactions based at least on the accumulated information. In one embodiment, the multi-objective engine may be to at least one of maximize revenues for the spectrum owners, ensure quality of service for the spectrum requestors or maximize radio spectrum utilization. while the cognitive engine may comprise machine learning algorithms to forecast predicted spectrum usage. In determining the radio spectrum trade transactions, the analytics engine may interact with at least one of a match-making engine, a rules-based engine, a negotiation broker, a time frequency unit (TFU) allocation engine, a broker-agent interface or a spectrum transaction management engine. In the same or a different embodiment, the management utilities module may comprise an order management processor to carry out the radio spectrum trade transactions. The management utilities module may also comprise a service level agreement (SLA) manager to ensure that terms agreed to in the radio spectrum trade transaction carried out by the order management processor are met by the spectrum requestors and spectrum owners.

In the same or a different embodiment, the system may comprise a persistence module comprising at least one database. The database may be to store information related to at least one of radio spectrum availability, radio spectrum characteristic information, radio spectrum geographical information and historical radio spectrum trade transaction information. A method consistent with at least one embodiment of the present disclosure may comprise, for example, receiving requests seeking available spectrum from a market for trading a spectrum of radio frequencies for use in wireless communication, matching the requests seeking available spectrum with the requests offering to lease spectrum to form radio spectrum trade transactions, and supervising execution of the radio spectrum trade transactions.

FIG. 1 illustrates example cloud spectrum management system (CSMS) 100 interacting with spectrum market 102 in accordance with at least one embodiment of the present disclosure. "Radio spectrum," as referenced herein, may comprise portions of the electromagnetic spectrum including radio frequencies usable for conducting wireless communication. Portions of the radio spectrum may be licensed regionally to certain entities (e.g., wireless service providers) for their exclusive use. Entities that may own exclusive licenses to use portions of the radio spectrum are referred to herein as spectrum owners. Spectrum requestors may be entities that seek permission to temporarily utilize portions of regulated bandwidth owned by spectrum owners. For example, a spectrum requestor may be wireless service provider that is realizing heavy traffic within its own licensed spectrum and is seeking additional spectrum to reduce bottlenecking and increase quality of service for its customers. In another example, a spectrum requestor may be a wireless service provider that doesn't own any licensed spectrum and leases spectrum from spectrum owners only for planned events (e.g., teleconference, video broadcast conducted over a wide area network (WAN) like the Internet, lecture, symposium, musical or theatrical performance etc.).

CSMS 100 may communicate with spectrum market 102 to facilitate radio spectrum trade transactions between spectrum requestors and spectrum owners. In this regard, CSMS 100 may also be referred to as a "broker" in that it may broker available radio spectrum between spectrum requestors and spectrum owners. During operation, CSMS 100 may communicate with spectrum requestors and spectrum owners directly, or with another CSMS 100 existing in spectrum market 102 to determine spectrum requirements and available spectrum to fulfill the requirements. It is therefore possible for CSMS 100 to interact with another CSMS 100 in spectrum market 102 to determine what requirements/availability exist within the other CSMS 100, and to broker a deal between spectrum requestors and spectrum brokers associated with different broker systems.

CSMS 100 may comprise, for example, at least market communication module 104, core services module 106 and management utilities module 108. The modules may be customized and/or configured via administrative services 110 and may be protected by security 112 using various known or to be developed methods and/or mechanisms including, for example, access control, privacy protection, data theft prevention, etc. Information may be stored in persistence module 114 and may be accessible to each of these three modules. Initially, a function of market communication module 104 may be to interact with spectrum market 102. This interaction may include exchanging information related to spectrum requestors, spectrum owners and the current conditions in spectrum market 102. The information resulting from this exchange may then be provided to core services module 106, which may employ the information along with, for example, historical or statistical information derived from persistence module 114 to determine radio spectrum trade transactions. Radio spectrum trade transactions may involve a spectrum owner agreeing to temporarily lease (e.g., for a certain time period or a certain amount of data) available radio spectrum to a spectrum requestor. The radio spectrum trade transactions determined by core services module 106 may then be provided to management utilities module 108 to carry out the radio spectrum trade transactions (e.g., to formalize the temporary transfer of usage rights, to initiate payments, etc.) and to monitor performance of the spectrum requestor and spectrum owner to ensure that the terms of the radio spectrum trade transaction are honored.

Administrative services 110 and security 112 may act as "cross layers" binding market communication module 104, core services module 106 and management utilities module 108 together. These cross layers may provide administration over the entire spectrum management process to authenticate spectrum holders and verify the eligibility of spectrum requestors and spectrum holders to participate in the brokerage process. Administrative services 110 and security 112 may also facilitate creation and enforcement of rules governing how CSMS 100 operates.

Figure 2:
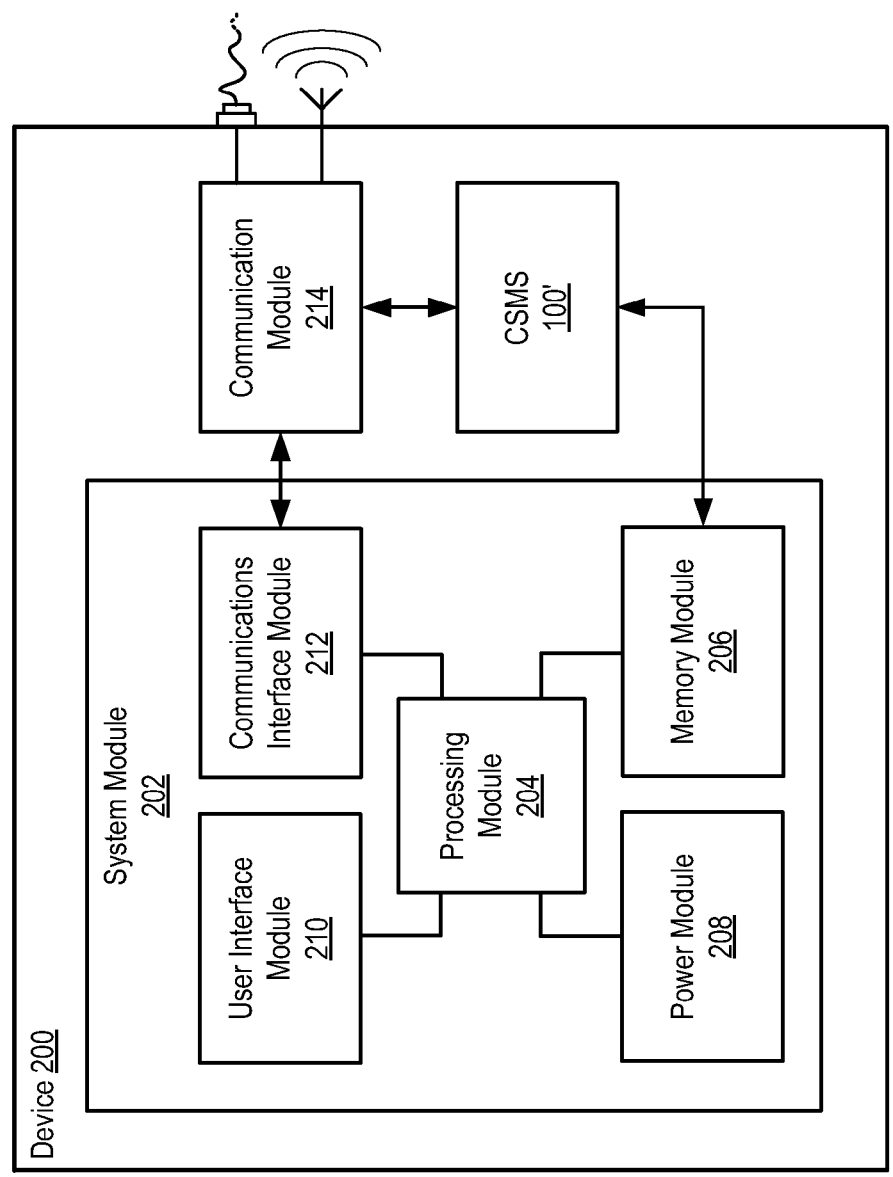
FIG. 2 illustrates an example configuration for a device usable in accordance with at least one embodiment of the present disclosure.

FIG. 2 illustrates an example configuration for device 200 usable in accordance with at least one embodiment of the present disclosure. Device 200 presents an example of equipment that may be used to implement some or all of CSMS 100 as illustrated in FIG. 1. For example, CSMS 100 may be implemented in part or in whole in a "cloud" configuration including one or more servers, storage devices, network equipment, etc. accessible via a WAN (e.g., the Internet) comprising the modules illustrated in FIG. 1. The one or more cloud servers may, for example, comprise features such as described with respect to device 200. Moreover, while some portions of CSMS 100 may be implemented in a cloud configuration, other portions may reside with the different possible participants in spectrum market 102. For example, some or all of the modules described in FIG. 1 may reside with spectrum requestors and/or spectrum owners (e.g., wireless service providers), with a third party operators of CSMS 100 such as a private or governmental spectrum regulatory authority, etc. It may also be possible to implement all aspects of CSMS 100 on the same device 200. Regardless, device 200 is meant only as an example of equipment usable in accordance with various embodiments consistent with the present disclosure, and is not meant to limit these various embodiments to any particular manner of implementation.

Device 200 may comprise system module 202 configured to generally manage device operations. System module 202 may include, for example, processing module 204, memory module 206, power module 208, user interface module 210 and communication interface module 212 that may be configured to interact with communication module 214. Device 200 may also include CSMS 100' configured to interact with at least memory module 206 and communication module 214. While CSMS 100' and communication module 214 are shown separate from system module 202, this is merely for the sake of explanation herein. Some or all of the functionality associated with CSMS 100' and/or communication module 212 may also be incorporated within system module 202.

In device 200, processing module 204 may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium, Xeon, Itanium, Celeron, Atom, Core i-series product families. Examples of support circuitry may include chipsets (e.g., Northbridge, Southbridge, etc. available from the Intel Corporation) configured to provide an interface through which processing module 204 may interact with other system components that may be operating at different speeds, on different buses, etc. in device 200. Some or all of the functionality commonly associated with the support circuitry may also be included in the same physical package as the processor (e.g., an SOC package like the Sandy Bridge integrated circuit available from the Intel Corporation).

Processing module 204 may be configured to execute various instructions in device 200. Instructions may include program code configured to cause processing module 204 to perform activities related to reading data, writing data, processing data, formulating data, converting data, transforming data, etc. Information (e.g., instructions, data, etc.) may be stored in memory module 206. Memory module 206 may comprise random access memory (RAM) or read-only memory (ROM) in a fixed or removable format. RAM may include memory configured to hold information during the operation of device 200 such as, for example, static RAM (SRAM) or Dynamic RAM (DRAM). ROM may include memories such as bios memory configured to provide instructions when device 200 activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 208 may include internal power sources (e.g., a battery) and/or external power sources (e.g., electromechanical or solar generator, power grid, etc.), and related circuitry configured to supply device 200 with the power needed to operate.

User interface module 210 may include circuitry configured to allow users to interact with device 200 such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 212 may be configured to handle packet routing and other control functions for communication module 214, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 212 may be configured to prevent wireless communications that are active in communication module 214 from interfering with each other. In performing this function, communication interface module 212 may schedule activities for communication module 214 based on, for example, the relative priority of messages awaiting transmission.

In one embodiment, CSMS 100' may comprise software and/or hardware configured to include some or all of the functional elements described in FIG. 1. It is also possible for some of the functional elements illustrated in FIG. 1 to be situated in other devices configured to interact with CSMS 100' via wired or wireless communication (e.g., in a distributed or cloud topology). For example, CSMS 100' may interact with memory module 206 to store information in, and retrieve information from, databases such as in persistence module 114. Moreover, CSMS 100' may also interact with communication module 214 when communicating with spectrum market 102, with other CSMS 100' situated in different geographic regions, etc. While not shown in FIG. 2, it may also be possible for CSMS 100' to interact with other modules in device 200 including, for example, processing module 204 to execute instructions associated with CSMS 100', with user interface module 210 to receive commands from an operator of CSMS 100', to display information in regard to CSMS 100', to issue visible/audible alerts, etc.

Figure 3:
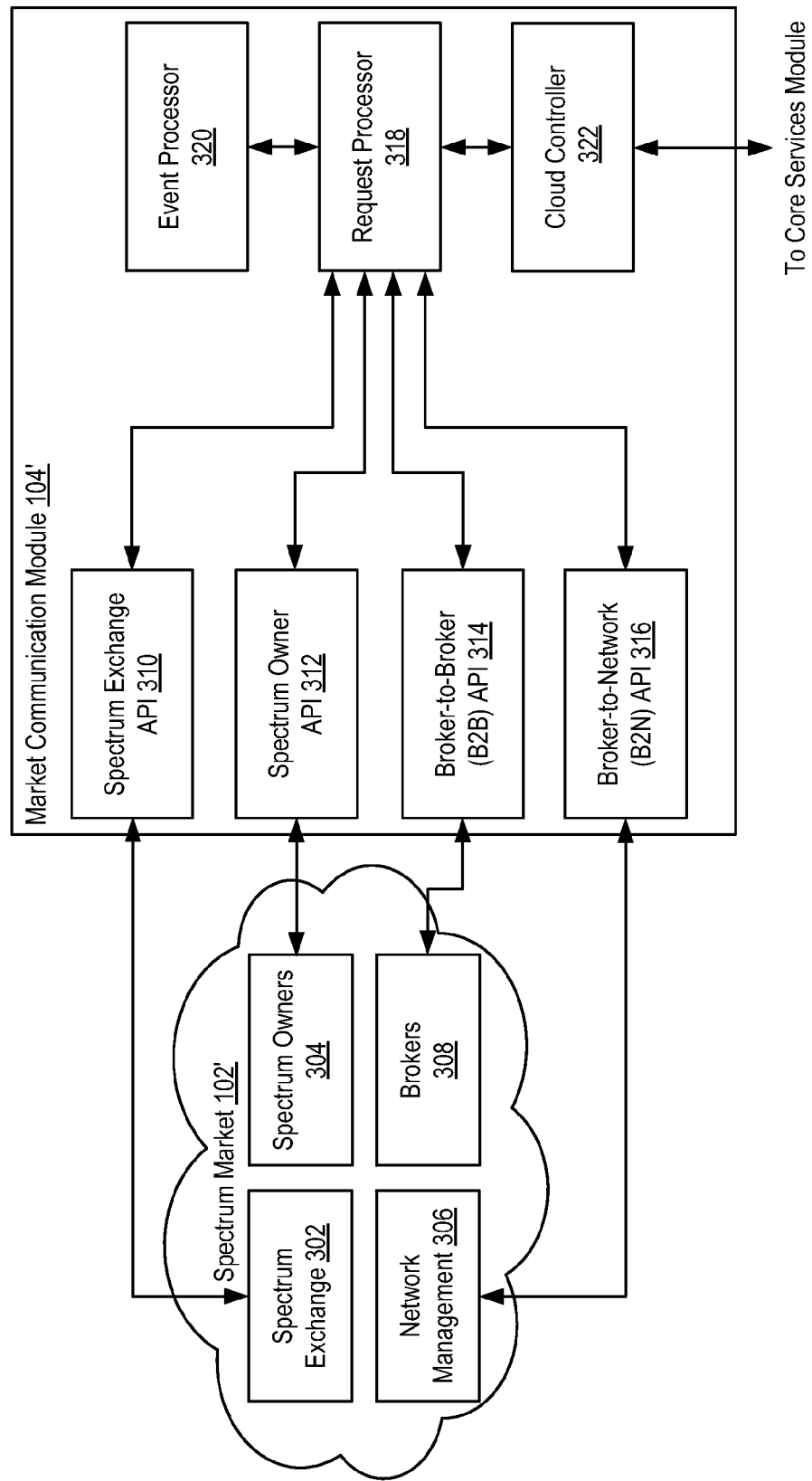
FIG. 3 illustrates an example configuration for a market communication module in accordance with at least one embodiment of the present disclosure.

FIG. 3 illustrates an example configuration for market communication module 104' in accordance with at least one embodiment of the present disclosure. Market communication module 104' may comprise various APIs configured to interact with spectrum market 102' and further elements to monitor/process information received from these APIs. Spectrum exchange API 310 may provide an interface to spectrum exchange 302 in spectrum market 102' to update and/or maintain status for spectrum market 102'. For example, spectrum exchange API 310 may make dynamic bindings with the operators of CSMS 100 and spectrum holders participating in CSMS 100, may perform clearance operations and payment management, etc. Spectrum Owner API 312 may provide an interface over which spectrum owners 304 in spectrum market 102' may communicate with CSMS 100 (e.g., to lease available radio spectrum, to reclaim leased radio spectrum, etc.). Broker-to-broker (B2B) API 314 may provide an interface over which brokers 308 (e.g., including at least one other CSMS 100) in spectrum market 102' to interact with CSMS 100. Broker-to-network (B2N) API 316 may provide an interface by which network management 306 in spectrum market 102' may communicate with CSMS 100. For example, B2N 316 may make it easier for CSMS 100 to communicate with other network components in the wireless networking infrastructure encompassed by spectrum market 102'.

Request processor 318 may be to process information received in market communication module 104' from APIs 310 to 316. For example, request processor 318 may receive requests from spectrum requestors seeking available radio spectrum, lease offers from spectrum owners seeking to lease available spectrum, requests to reclaim leased spectrum from spectrum owners that have leased spectrum but are now experiencing unexpected demand, and similar information from other brokers (e.g., at least one other CSMS 100). In processing this information request processor 318 may collate types of information, aggregate similar requests/offers, filter certain types of information, organize the information for later processing, etc. Event processor 320 may monitor the information received by request processor 218 to look for particular events (e.g., trends, values, types of information, etc.). For example, event processor 318 may detect an increase in spectrum orders, may detect a trigger indicating increased order congestion, etc. If an event is detected, event processor 320 may, for example, cause certain functionality to occur in CSMS 100 (e.g., to alleviate congestion), cause an alert to be presented to operators of CSMS 100, etc. Cloud controller 322 may communicate with core services module 106. For example, cloud controller 322 may provide the information processed by request processor 318 to core services module 106 and may request processing of radio spectrum trade transactions.

Figure 4:
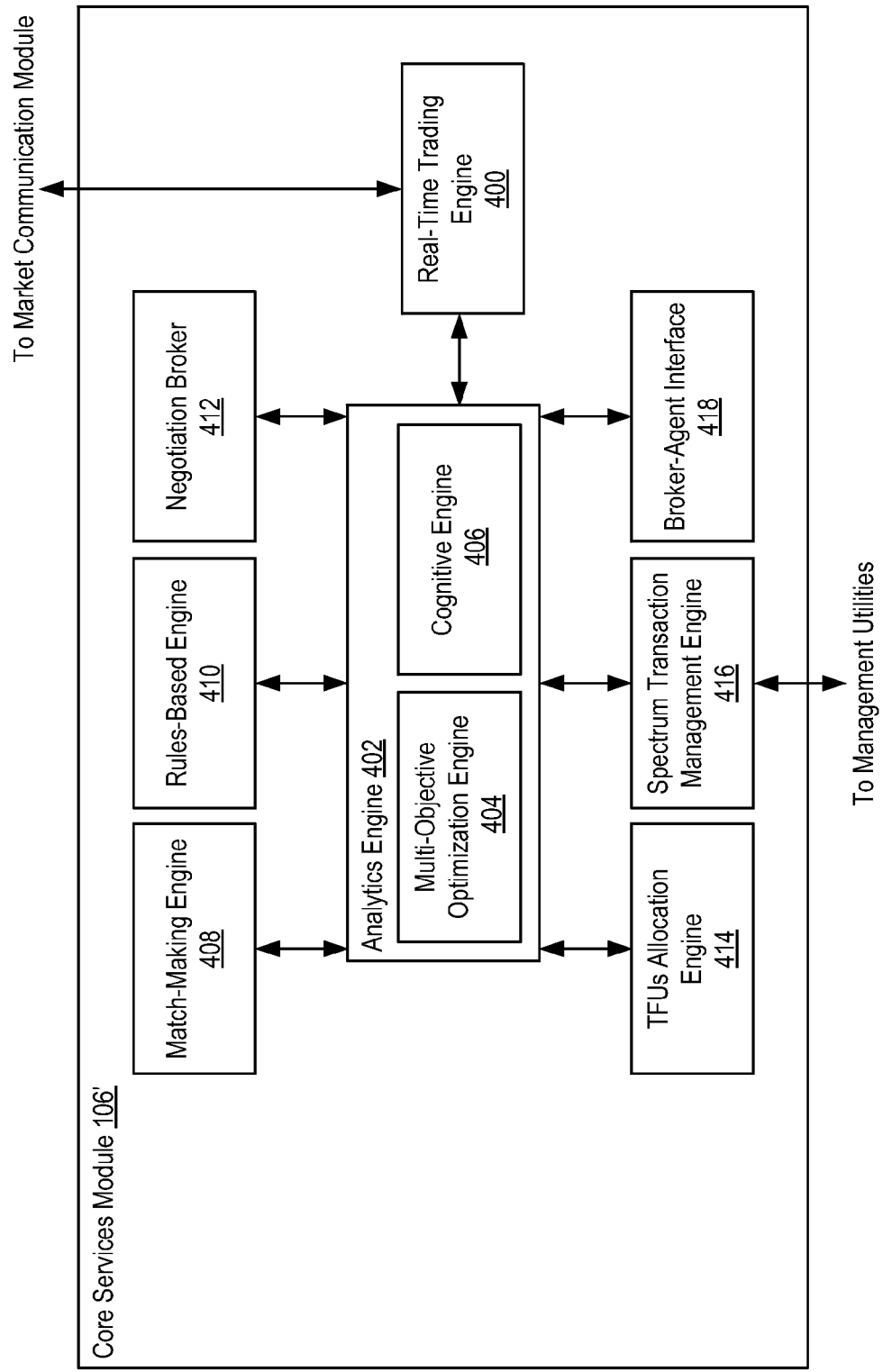
FIG. 4 illustrates an example configuration for a core services module in accordance with at least one embodiment of the present disclosure.

FIG. 4 illustrates an example configuration for core services module 106' in accordance with at least one embodiment of the present disclosure. Real time trading engine 402 may be responsible for the trading of radio spectrum, wherein spectrum requestors are matched with spectrum owners. In one embodiment, radio spectrum may be traded in time frequency units (TFU). Determining the spectrum requesters to match with the spectrum owners may be based on a multitude of criteria. Real-time trading engine 400 may receive input from analytics engine 402 in this regard. Analytics engine 402 may include, for example, multi-objective optimization engine 404 and cognitive engine 406. In one embodiment, multi-objective optimization engine 404 may include one or more optimization algorithms used by analytics engine 402 to fulfill the objective of spectrum trading in terms of, for example, maximizing the revenue for the spectrum holders, ensuring the quality of service and performance for spectrum lessors, maximizing spectrum utilization and optimum allocation, etc. These objectives may be performed based criteria such as, for example, radio context info, application requirements, device mobility models, wireless traffic requirements, power levels, spectrum availability, geographic location, spectrum rentals offers/requests, etc. Cognitive engine 406 is also important to the operation of analytics engine 402 in that it may be composed of a set of machine learning algorithms that use spectrum usage patterns along with historical information to attempt to predict and forecast the usage of radio spectrum (e.g., at particular times, locations, etc.). For example, video conference calls may be made on a regular basis (time and location), cognitive engine 406 may identify the pattern of radio spectrum usage to help in forecasting the allocation of radio spectrum needs to make the video call in a smooth and proper way with the required quality.

Other elements in core services module 106' may provide information useful to analytics engine 403 for determining the best pairings between spectrum requestors and spectrum owners. For example, match-making engine 408 may help to determine matches between TFUs available for trading according to price (e.g., bid and ask prices) and geographical location of the available radio spectrum. Rules-based engine 410 may be responsible for establishing TFU trading rules and brokerage criteria to help develop an efficient, customizable trading and brokerage system. Negotiation broker 412 may help to select a strategy (e.g., from a selection of predetermined strategies based on, for example, historical performance information). The strategy may dictate how certain bargaining situations may be handled automatically including, for example, initial price/TFU offers, counter offers, offer acceptance, unfulfilled requirement handling, etc. TFUs allocation engine 414 may operate to gather information related to settled trading operations in terms of, for example, the amount of available spectrum that was leased, the duration of usage for the available spectrum, the price/TFU at which the available spectrum is being leased, etc. TFUs allocation engine 414 may also collect information related to the available spectrum that was leased including, for example, frequency bands, radio interface, power levels, etc., which may be communicated to the entity that leased the spectrum (e.g., wireless service provider) as part of a transaction to start the actual scheduling and allocation of the available spectrum. Spectrum transaction management engine 416 may collect, store, modify, retrieve, etc. radio spectrum trade transactions, and thus, may interact with management utilities module 108. For example, spectrum transaction manage engine 416 may ensure that the trading experience is consistent and atomic for all parties (e.g., spectrum requestors and spectrum owners), and may also orchestrate "roll-backs" wherein leased spectrum is returned to the spectrum owner based on certain situations including, for example, the spectrum requester not acting in accordance with the terms of the radio spectrum trading transaction (e.g., not paying for the leased spectrum, not using the leased spectrum in accordance with limitations set forth by the spectrum owner) or the spectrum owner needing to reclaim the spectrum (e.g., due to unforeseen traffic increases, for emergency needs, etc.). Broker-Agent interface 418 may provide an interface into core services module 106' to, for example, allow other brokers to determine trading characteristics (e.g., for standardization, etc.).

Figure 5:
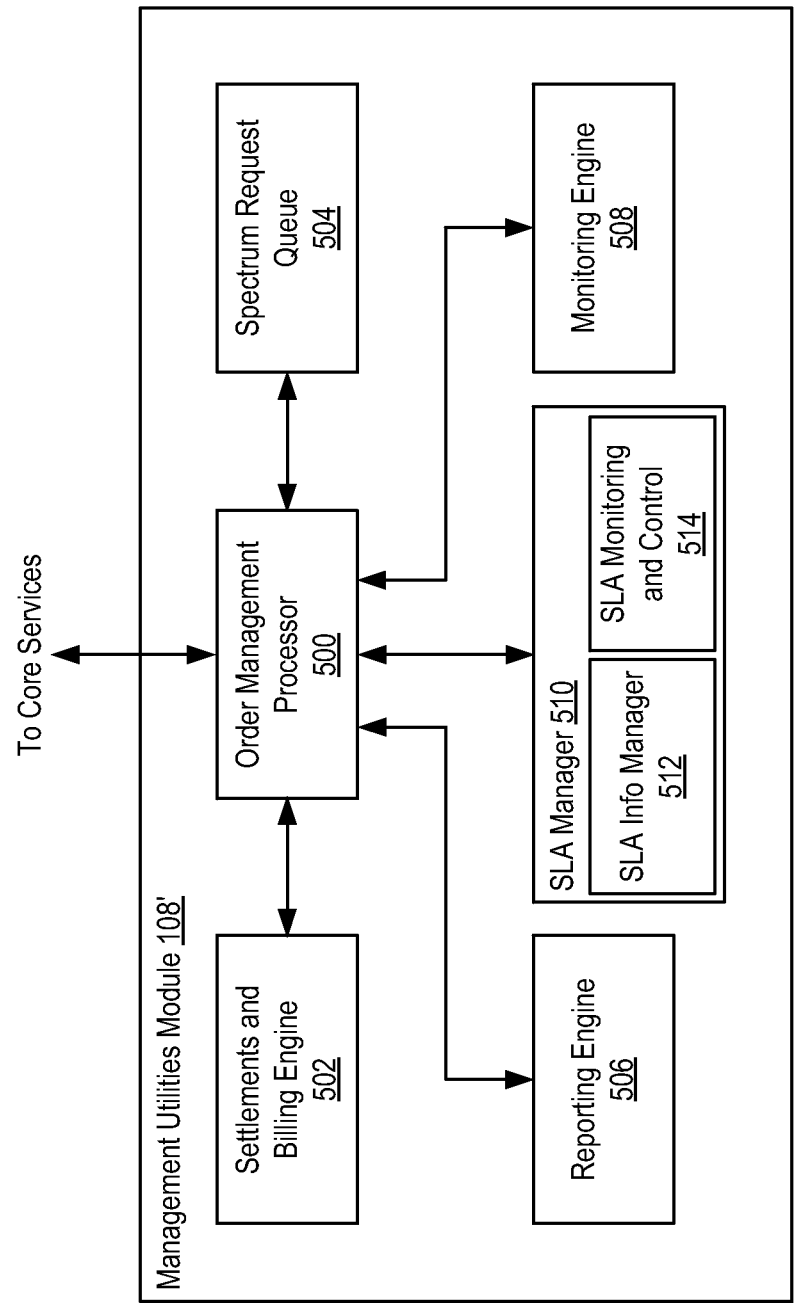
FIG. 5 illustrates an example configuration for a management utilities module in accordance with at least one embodiment of the present disclosure.

FIG. 5 illustrates an example configuration for a management utilities module 108' in accordance with at least one embodiment of the present disclosure. Initially, order management processor 500 may receive radio spectrum trade transactions from core services module 106. In one embodiment, order management processor 500 may review the incoming radio spectrum trade transactions for accuracy and/or errors. Settlements and billing engine 502 may then take care of billing the appropriate entity (e.g., the spectrum requestor) for the leased spectrum and crediting the proceeds to the spectrum owner. Reporting engine 506 may report statistics for CSMS 100 including, for example, the volume of transactions, the type of transactions, amounts of completed/rolled-back transactions, geographic spectrum leasing statistics, etc. Monitoring engine 506 may operate to generally monitor CSMS 100 and alert the operators of CSMS 100 as to any anomalies or problems with the system. Service Level Agreement (SLA) manager 510 may be to monitor completed radio spectrum trade transactions at least in regard to the adherence of both parties to the agreed upon terms and conditions. SLA manager 510 may comprise, for example, SLA information manager 512 and SLA monitoring and control 514. SLA information manager 512 may keep track of the terms for active radio spectrum trade transactions. For example, SLA information manager 512 may include settings for standardized terms such as least start time, lease duration, lease frequencies, lease geographic limitations, power restrictions, etc. SLA monitoring and control 514 may then monitor the performance of both the spectrum requestor and the spectrum owner to ensure that the terms are met. If terms are violated, SLA monitoring and control 514 may automatically take action including, for example, transmitting notifications to the spectrum requestor, spectrum owner and/or the operators of CSMS 100, rolling back the radio spectrum trade transaction, refunding payments made in the radio spectrum trade transaction, discontinuing trading for the spectrum requestor and/or spectrum owner, etc.

Figure 6:
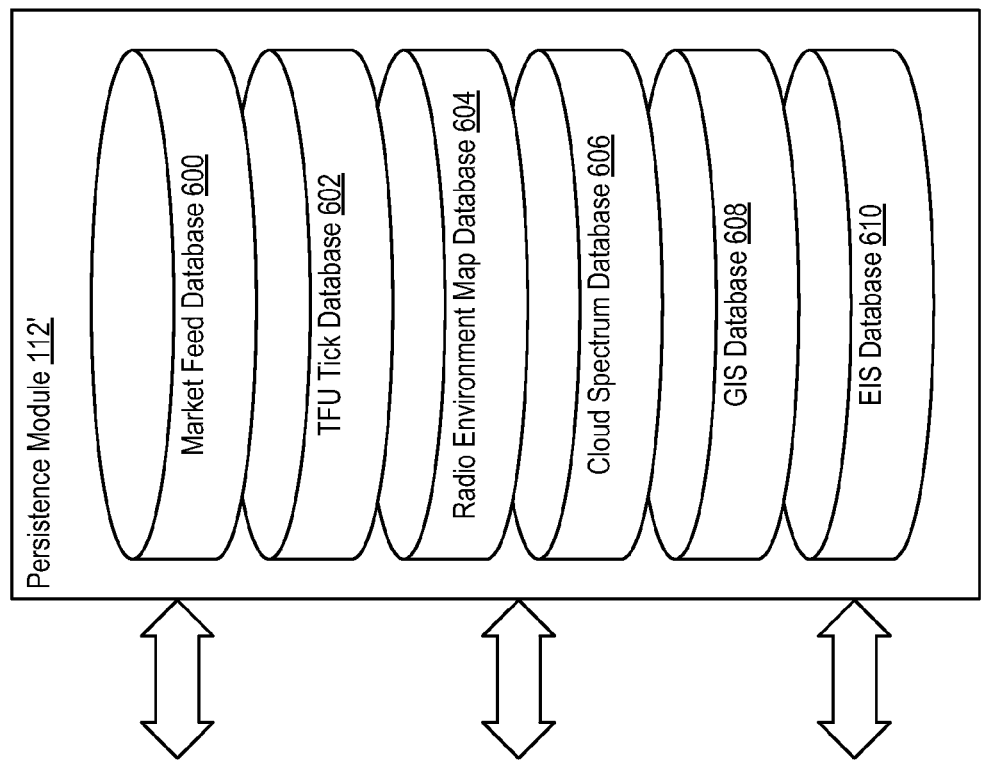
FIG. 6 illustrates an example configuration for a persistence module in accordance with at least one embodiment of the present disclosure.

FIG. 6 illustrates an example configuration for persistence module 112 in accordance with at least one embodiment of the present disclosure. Persistence module 112' may include one or more databases configured to store information related to spectrum trade market 102 and radio spectrum trade transactions. While various example databases are illustrated in FIG. 6 for the sake of explanation herein, various embodiments consistent with the present disclosure are not limited only to these databases, and may include more or less databases storing other data.

Market feed database 600 may include data about the condition of spectrum market 102 such as, for example, market status, market news, announcements about the availability of radio spectrum, etc. TFU tick database 602 may include snapshots (e.g., real-time) of the allocation and/or de-allocation of TFUs. This information may allow brokers to have an instant and precise status about the availability of radio spectrum to be rented to spectrum requestors or to be reclaimed by the spectrum owners. Radio environment map database 604 may include domain environmental information from cognitive radios (e.g., wireless radios able to sense information about their operation, environment, interference, etc. and to change their operation accordingly). This information may include geographical features, available networks and services, spectrum policies and regulations, locations and activities of neighboring/encountered radios, experiences, etc. Radio environment map database 604 may be used by, for example, cognitive engine 406 to learn from past experiences, context awareness, reasoning and to forecast the allocation of proper channels for end users. Cloud spectrum database 606 may include data pertaining to spectrum availability in terms of, for example, available channels (e.g., radio spectrum), schedule of using the channels, coverage parameters, location (latitude and longitude), price per TFU, maximum power levels and spectrum license (licensed or unlicensed). Geographical information system (GIS) database 608 may include information about geographical features and/or boundaries such as, for example, roads, railroads, intersections, traffic conditions etc. This type of information may be usable by analytics engine 402 as available spectrum may be identified based on location and time. Enterprise information system (EIS) database 610 may capture historical information pertaining to radio spectrum trade transactions, payments, orders etc. The information in EIS database 610 may be used to, for example, determine historical trends, predict performance, identify potential problem locations and/or times, perform system reporting for CSMS 100, etc.

Figure 7:
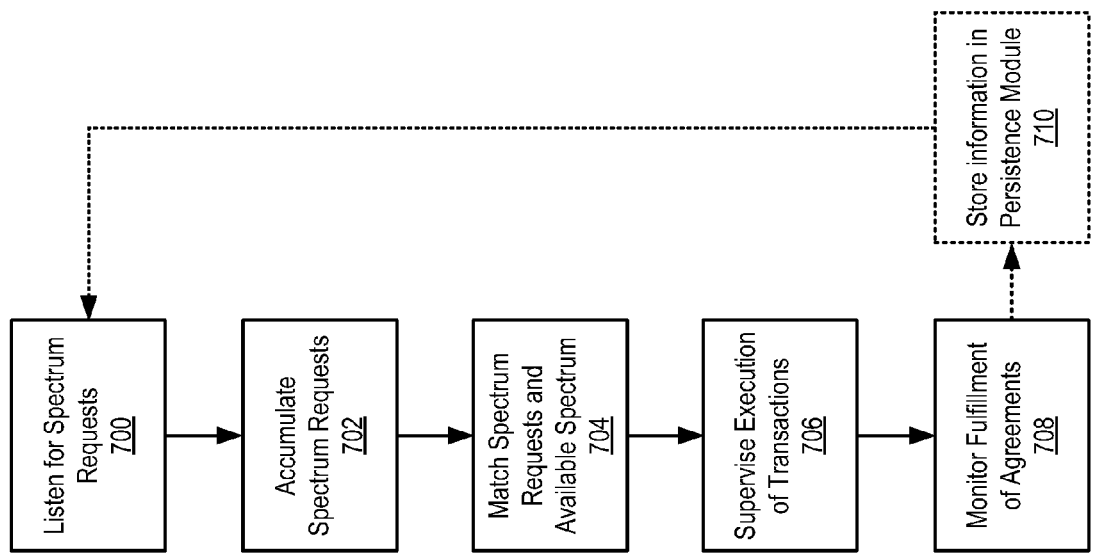
FIG. 7 illustrates example operations related to a cloud spectrum management system in accordance with at least one embodiment of the present disclosure.

FIG. 7 illustrates example operations related to a cloud spectrum management system in accordance with at least one embodiment of the present disclosure. In operation 700 a CSMS may listen for spectrum requests. For example, a market communication module may interact with a spectrum market to receive requests from spectrum requestors seeking available radio spectrum and spectrum owners desiring to lease available radio spectrum or to reclaim leased radio spectrum. These requests may be accumulated in operation 702 prior to matching being performed wherein spectrum requests may be matched to available radio spectrum in operation 704. Operation 704 may be performed by, for example, a core services module in the CSMS.

The matching performed in operation 704 may result in one or more radio spectrum trade transactions, the execution of which may be supervised in operation 706. For example, in one embodiment management utilities in the CSMS may ensure that the leased spectrum is reserved for the spectrum requestor and that the spectrum owner is compensated in accordance with the terms of the radio spectrum trade transaction. In operation 708 the radio spectrum trade transactions may be monitored to ensure that the terms agreed to by the participants (e.g., the spectrum requestor and the spectrum owner) are fulfilled. In operation 710, information may be stored in a persistence module related to the transaction. Operation 710 may be optional (e.g., dotted line) in that whether information is stored depends on whether there is a corresponding database in the persistence module to accept the data. Operation 710 may then be followed by an optional return to operation 700 in preparation for the reception of additional spectrum requests.

While FIG. 7 illustrates various operations according to an embodiment, it is to be understood that not all of the operations depicted in FIG. 7 are necessary for other embodiments. Indeed, it is fully contemplated herein that in other embodiments of the present disclosure, the operations depicted in FIG. 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to a cloud spectrum management system. In general, an example cloud spectrum management system may match requests from spectrum requestors seeking available radio spectrum with spectrum owners desiring to lease available radio spectrum to determine radio spectrum trade transactions. An example system may include a market communication module to communicate with a market place for trading a spectrum of radio frequencies for use in wireless communication, a core services module to determine radio spectrum trade transactions based at least on the communications between the market communication module and the market, and a management utilities module configured to manage the radio spectrum trade transactions determined by the core services module.

The following examples pertain to further embodiments. In one example there is provided a system. The system may include a market communication module to communicate with a market for trading a spectrum of radio frequencies for use in wireless communication, a core services module to determine radio spectrum trade transactions based at least on the communications between the market communication module and the market and a management utilities module configured to manage the radio spectrum trade transactions determined by the core services module.

The above example system may be further configured, wherein the market communication module comprises at least one application programming interface (API) to receive information from at least one of spectrum requestors seeking available radio spectrum or spectrum owners desiring to lease available radio spectrum or reclaim leased radio spectrum. In this configuration the example system may be further configured, wherein the market communication module comprises at least one of a request processor to accumulate the information received from the spectrum requestors and the spectrum owners, an event processor to monitor the request processor for events and a cloud controller to communicate with the core services module. In this configuration the example system may be further configured, wherein the core services module comprises a real-time trading engine to receive the accumulated information from the market information module and an analytics engine utilizing at least one of a multi-objective optimization engine or a cognitive engine to determine the radio spectrum trade transactions based at least on the accumulated information. In this configuration the example system may be further configured, wherein the multi-objective engine is to at least one of maximize revenue for the spectrum owners, ensure quality of service for the spectrum requestors or maximize radio spectrum utilization. In this configuration the example system may be further configured, wherein the cognitive engine comprises machine learning algorithms to forecast predicted spectrum usage. In this configuration the example system may be further configured, wherein the analytics engine interacts with at least one of a match-making engine, a rules-based engine, a negotiation broker, a time frequency unit (TFU) allocation engine, a broker-agent interface or a spectrum transaction management engine also in the core services module when determining the radio spectrum trade transactions.

The above example system may be further configured, alone or in combination with the above further configurations, wherein the management utilities module comprises an order management processor to carry out the radio spectrum trade transactions. In this configuration the example system may be further configured, wherein the management utilities module comprises a service level agreement (SLA) manager to ensure that terms agreed to in the radio spectrum trade transactions carried out by the order management processor are met by the spectrum requestors and spectrum owners.

The above example system may be further comprise, alone or in combination with the above further configurations, a persistence module including at least one database to store information related to at least one of radio spectrum availability, radio spectrum characteristic information, radio spectrum geographical information and historical radio spectrum trade transaction information.

In another example there is provided a method. The method may include receiving requests seeking available spectrum, offering to lease spectrum and seeking to reclaim spectrum from a market for trading a spectrum of radio frequencies for use in wireless communication, matching the requests seeking available spectrum with the requests offering to lease spectrum to form radio spectrum trade transactions, and supervising execution of the radio spectrum trade transactions.

The above example method may further comprise accumulating the requests received from the market in a market communication module prior to submitting the requests to a core service module including at least an analytics engine for matching the requests. In this configuration the example method may be further configured, wherein matching the requests is performed by at least one of a multi-objective optimization engine or a cognitive engine in the analytics engine.

The above example method may further comprise, alone or in combination with the above further configurations, ensuring that the terms of the radio spectrum trade transactions are fulfilled by monitoring the radio spectrum trade transactions in a management utilities module.

The above example method may further comprise, alone or in combination with the above further configurations, storing information related to the radio spectrum trade transactions in a persistence database module.

In another example there is provided a cloud spectrum management system arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured for cloud spectrum management arranged to perform any of the above example methods.

In another example there is provided a device having means to perform any of the above example methods.

In another example there is provided at least one machine-readable storage medium having stored thereon individually or in combination, instructions that when executed by one or more processors result in the system carrying out any of the above example methods.

In another example there is provided a system. The system may include a market communication module to communicate with a market for trading a spectrum of radio frequencies for use in wireless communication, a core services module to determine radio spectrum trade transactions based at least on the communications between the market communication module and the market, and a management utilities module configured to manage the radio spectrum trade transactions determined by the core services module.

The above example system may be further configured, wherein the market communication module comprises at least one application programming interface (API) to receive information from at least one of spectrum requestors seeking available radio spectrum or spectrum owners desiring to lease available radio spectrum or reclaim leased radio spectrum. In this configuration the example system may be further configured, wherein the market communication module comprises at least one of a request processor to accumulate the information received from the spectrum requestors and the spectrum owners, an event processor to monitor the request processor for events and a cloud controller to communicate with the core services module. In this configuration the example system may be further configured, wherein the core services module comprises a real-time trading engine to receive the accumulated information from the market information module and an analytics engine utilizing at least one of a multi-objective optimization engine or a cognitive engine to determine the radio spectrum trade transactions based at least on the accumulated information. In this configuration the example system may be further configured, wherein the multi-objective engine is to at least one of maximize revenue for the spectrum owners, ensure quality of service for the spectrum requestors or maximize radio spectrum utilization and the cognitive engine comprises machine learning algorithms to forecast predicted spectrum usage. In this configuration the example system may be further configured, wherein the analytics engine interacts with at least one of a match-making engine, a rules-based engine, a negotiation broker, a trading frequency unit (TFU) allocation engine, a broker-agent interface or a spectrum transaction management engine also in the core services module when determining the radio spectrum trade transactions.

The above example system may be further configured, alone or in combination with the above further configurations, wherein the management utilities module comprises an order management processor to carry out the radio spectrum trade transactions and a service level agreement (SLA) manager to ensure that terms agreed to in the radio spectrum trade transactions carried out by the order management processor are met by the spectrum requestors and spectrum owners.

The above example system may further comprise, alone or in combination with the above further configurations, a persistence module including at least one database to store information related to at least one of radio spectrum availability, radio spectrum characteristic information, radio spectrum geographical information and historical radio spectrum trade transaction information.

In another example there is provided a method. The method may include receiving requests seeking available spectrum, offering to lease spectrum and seeking to reclaim spectrum from a market for trading a spectrum of radio frequencies for use in wireless communication, matching the requests seeking available spectrum with the requests offering to lease spectrum to form radio spectrum trade transactions, and supervising execution of the radio spectrum trade transactions.

The above example method may further comprise accumulating the requests received from the market in a market communication module prior to submitting the requests to a core service module including at least an analytics engine, wherein matching the requests is performed by at least one of a multi-objective optimization engine or a cognitive engine in the analytics engine.

The above example method may further comprise, alone or in combination with the above further configurations, ensuring that the terms of the radio spectrum trade transactions are fulfilled by monitoring the radio spectrum trade transactions in a management utilities module.

The above example method may further comprise, alone or in combination with the above further configurations, storing information related to the radio spectrum trade transactions in a persistence database module.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured for cloud spectrum management arranged to perform the method of any of the above example methods.

In another example there is provided a system. The system may include a market communication module to communicate with a market for trading a spectrum of radio frequencies for use in wireless communication, a core services module to determine radio spectrum trade transactions based at least on the communications between the market communication module and the market and a management utilities module configured to manage the radio spectrum trade transactions determined by the core services module.

The above example system may be further configured, wherein the market communication module comprises at least one application programming interface (API) to receive information from at least one of spectrum requestors seeking available radio spectrum or spectrum owners desiring to lease available radio spectrum or reclaim leased radio spectrum. In this configuration the example system may be further configured, wherein the market communication module comprises at least one of a request processor to accumulate the information received from the spectrum requestors and the spectrum owners, an event processor to monitor the request processor for events and a cloud controller to communicate with the core services module. In this configuration the example system may be further configured, wherein the core services module comprises a real-time trading engine to receive the accumulated information from the market information module and an analytics engine utilizing at least one of a multi-objective optimization engine or a cognitive engine to determine the radio spectrum trade transactions based at least on the accumulated information. In this configuration the example system may be further configured, wherein the multi-objective engine is to at least one of maximize revenue for the spectrum owners, ensure quality of service for the spectrum requestors or maximize radio spectrum utilization. In this configuration the example system may be further configured, wherein the cognitive engine comprises machine learning algorithms to forecast predicted spectrum usage. In this configuration the example system may be further configured, wherein the analytics engine interacts with at least one of a matchmaking engine, a rules-based engine, a negotiation broker, a time frequency unit (TFU) allocation engine, a broker-agent interface or a spectrum transaction management engine also in the core services module when determining the radio spectrum trade transactions.

The above example system may be further configured, alone or in combination with the above further configurations, wherein the management utilities module comprises an order management processor to carry out the radio spectrum trade transactions. In this configuration the example system may be further configured, wherein the management utilities module comprises a service level agreement (SLA) manager to ensure that terms agreed to in the radio spectrum trade transactions carried out by the order management processor are met by the spectrum requestors and spectrum owners.

The above example system may be further comprise, alone or in combination with the above further configurations, a persistence module including at least one database to store information related to at least one of radio spectrum availability, radio spectrum characteristic information, radio spectrum geographical information and historical radio spectrum trade transaction information.

In another example there is provided a method. The method may include receiving requests seeking available spectrum, offering to lease spectrum and seeking to reclaim spectrum from a market for trading a spectrum of radio frequencies for use in wireless communication, matching the requests seeking available spectrum with the requests offering to lease spectrum to form radio spectrum trade transactions, and supervising execution of the radio spectrum trade transactions.

The above example method may further comprise accumulating the requests received from the market in a market communication module prior to submitting the requests to a core service module including at least an analytics engine for matching the requests. In this configuration the example method may be further configured, wherein matching the requests is performed by at least one of a multi-objective optimization engine or a cognitive engine in the analytics engine.

The above example method may further comprise, alone or in combination with the above further configurations, ensuring that the terms of the radio spectrum trade transactions are fulfilled by monitoring the radio spectrum trade transactions in a management utilities module.

The above example method may further comprise, alone or in combination with the above further configurations, storing information related to the radio spectrum trade transactions in a persistence database module.

In another example there is provided a system. The system may include means for receiving requests seeking available spectrum, offering to lease spectrum and seeking to reclaim spectrum from a market for trading a spectrum of radio frequencies for use in wireless communication, means for matching the requests seeking available spectrum with the requests offering to lease spectrum to form radio spectrum trade transactions, and means for supervising execution of the radio spectrum trade transactions.

The above example system may further comprise means for accumulating the requests received from the market in a market communication module prior to submitting the requests to a core service module including at least an analytics engine for matching the requests. In this configuration the example system may be further configured, wherein matching the requests is performed by at least one of a multi-objective optimization engine or a cognitive engine in the analytics engine.

The above example system may further comprise, alone or in combination with the above further configurations, means for ensuring that the terms of the radio spectrum trade transactions are fulfilled by monitoring the radio spectrum trade transactions in a management utilities module.

The above example system may further comprise, alone or in combination with the above further configurations, means for storing information related to the radio spectrum trade transactions in a persistence database module.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A computer-implemented method for wireless spectrum management, comprising:
    forecasting, using at least cognitive engine circuitry in a cloud spectrum management system, radio spectrum usage for a particular time and a particular location, the cognitive engine circuitry including a set of machine learning algorithms to predict the radio spectrum usage based on spectrum usage patterns and historical information;
    receiving, at market communication circuitry of the cloud spectrum management system, requests seeking available spectrum, offering to lease spectrum and seeking to reclaim spectrum from a market for trading a spectrum of radio frequencies for use in wireless communication;
    matching, using core services circuitry of the cloud spectrum management system, the requests seeking available spectrum with the requests offering to lease spectrum to form radio spectrum trade transactions;
    supervising, using management utilities circuitry of the cloud spectrum management system, execution of the radio spectrum trade transactions; and
    returning leased spectrum to an owner of the leased spectrum based on the owner of the leased spectrum experiencing an unforeseen traffic increase.

2. The method of claim 1, further comprising accumulating the requests received from the market in market communication circuitry prior to submitting the requests to the core service circuitry including at least an analytics engine for matching the requests.

3. The method of claim 2, wherein matching the requests is performed by at least one of a multi-objective optimization engine or a cognitive engine in the analytics engine.

4. The method of claim 1, further comprising ensuring that the terms of the radio spectrum trade transactions are fulfilled by monitoring the radio spectrum trade transactions in the management utilities circuitry.

5. The method of claim 1, further comprising storing information related to the radio spectrum trade transactions in persistence database circuitry associated with the cloud spectrum management system.

6. A non-transitory computer-readable storage medium having stored thereon, individually or in combination, instructions that when executed by one or more processors of a spectrum management system result in the following operations comprising:

forecasting radio spectrum usage for a particular time and a particular location based on spectrum usage patterns and historical information;

receiving requests seeking available spectrum, offering to lease spectrum and seeking to reclaim spectrum from a market for trading a spectrum of radio frequencies for use in wireless communication;

matching the requests seeking available spectrum with the requests offering to lease spectrum to form radio spectrum trade transactions;

supervising execution of the radio spectrum trade transactions; and returning leased spectrum to an owner of the leased spectrum based on the owner of the leased spectrum experiencing an unforeseen traffic increase.

7. The storage medium of claim 6, further comprising instructions that when executed by one or more processors result in the following operations comprising:

accumulating the requests received from the market in market communication circuitry prior to submitting the requests to core service circuitry including at least an analytics engine for matching the requests.

8. The storage medium of claim 7, wherein matching the requests is performed by at least one of a multi-objective optimization engine or a cognitive engine in the analytics engine.

9. The storage medium of claim 6, further comprising instructions that when executed by one or more processors result in the following operations comprising:

ensuring that the terms of the radio spectrum trade transactions are fulfilled by monitoring the radio spectrum trade transactions in management utilities circuitry.

10. The storage medium of claim 6, further comprising instructions that when executed by one or more processors result in the following operations comprising:

storing information related to the radio spectrum trade transactions in persistence database circuitry.

* * * * *